United States Patent
Bhattarai et al.

(10) Patent No.: US 8,261,864 B2
(45) Date of Patent: Sep. 11, 2012

(54) HYBRID POWERTRAIN AUTO START CONTROL SYSTEM WITH ENGINE PULSE CANCELLATION

(75) Inventors: Birendra P. Bhattarai, Novi, MI (US); Bon Ho Bae, Torrance, CA (US); Leah Dunbar, Manhattan Beach, CA (US)

(73) Assignee: GM Global Technology Operations LLC

( * ) Notice: Subject to any disclaimer, the term of this patent is extended or adjusted under 35 U.S.C. 154(b) by 546 days.

(21) Appl. No.: 12/466,747

(22) Filed: May 15, 2009

(65) Prior Publication Data

US 2009/0308674 A1    Dec. 17, 2009

Related U.S. Application Data (60) Provisional application No. 61/073,104, filed on Jun. 17, 2008.

(51) Int. Cl.
*B60W 10/04* (2006.01)
(52) U.S. Cl. .................. 180/65.285; 701/22
(58) Field of Classification Search ........... 180/65.285, 180/65.265, 65.21; 903/902, 930; 701/22; 318/432, 434; 290/7
See application file for complete search history.

(56) References Cited

U.S. PATENT DOCUMENTS

| | | | | |
|---|---|---|---|---|
| 6,026,921 A * | 2/2000 | Aoyama et al. | ............ | 180/65.25 |
| 6,758,293 B2 * | 7/2004 | Kayukawa et al. | ........ | 180/65.26 |
| 7,023,150 B2 * | 4/2006 | Hisada et al. | .................. | 318/34 |
| 7,032,571 B2 * | 4/2006 | Takama et al. | ........... | 123/406.23 |
| 7,162,998 B1 * | 1/2007 | Bartlett et al. | ........... | 123/339.11 |
| 7,332,884 B2 * | 2/2008 | Rozman et al. | ............... | 318/432 |
| 7,347,803 B2 * | 3/2008 | Kobayashi et al. | ............... | 477/5 |
| 7,407,026 B2 * | 8/2008 | Tamor | ........................ | 180/65.28 |
| 7,704,185 B2 * | 4/2010 | Babcock et al. | .................. | 477/3 |
| 7,863,843 B2 * | 1/2011 | Tamai et al. | ................... | 318/432 |
| 7,977,963 B2 * | 7/2011 | Bae et al. | ................. | 324/764.01 |
| 8,042,632 B2 * | 10/2011 | Wisniewski | ............. | 180/65.265 |
| 8,157,035 B2 * | 4/2012 | Whitney et al. | .......... | 180/65.265 |
| 2002/0195287 A1 * | 12/2002 | Kayukawa et al. | ......... | 180/65.2 |
| 2003/0089539 A1 * | 5/2003 | Kadota | ........................ | 180/65.2 |
| 2006/0012321 A1 * | 1/2006 | Rozman et al. | ............... | 318/432 |
| 2006/0218896 A1 * | 10/2006 | Ando et al. | ..................... | 60/277 |
| 2009/0308674 A1 * | 12/2009 | Bhattarai et al. | ......... | 180/65.265 |
| 2011/0165993 A1 * | 7/2011 | Stoffels et al. | .................. | 477/15 |
| 2011/0213518 A1 * | 9/2011 | Welchko et al. | ................ | 701/22 |
| 2011/0276251 A1 * | 11/2011 | Kang et al. | .................... | 701/103 |
| 2011/0288734 A1 * | 11/2011 | Phillips et al. | .................. | 701/58 |
| 2012/0004063 A1 * | 1/2012 | Koyama et al. | .................... | 475/5 |
| 2012/0035793 A1 * | 2/2012 | Kang et al. | ...................... | 701/22 |
| 2012/0083952 A1 * | 4/2012 | Smith et al. | ..................... | 701/22 |
| 2012/0089287 A1 * | 4/2012 | Nishiyama | ..................... | 701/22 |

* cited by examiner

*Primary Examiner* — J. Allen Shriver, II
*Assistant Examiner* — Brodie Follman (57) ABSTRACT

A control system for a hybrid powertrain includes an engine start detector that detects when an engine of the hybrid powertrain is activated via an electric motor during an auto start. An electric motor speed monitor determines a first speed of the electric motor for a first time and a second speed of the electric motor for a second time after detection of the engine in an active state. A control module determines a rate of change in speed of the electric motor based on the first speed and the second speed. The control module adjusts torque output of the electric motor during startup of the engine and based on the rate of change in speed.

18 Claims, 6 Drawing Sheets

HYBRID POWERTRAIN AUTO START CONTROL SYSTEM WITH ENGINE PULSE CANCELLATION

CROSS-REFERENCE TO RELATED APPLICATIONS

This application claims the benefit of U.S. Provisional Application No. 61/073,104 filed on Jun. 17, 2008. The disclosure of the above application is incorporated herein by reference.

FIELD

The present disclosure relates to vehicle control systems and more particularly to electronic throttle control.

BACKGROUND

The statements in this section merely provide background information related to the present disclosure and may not constitute prior art.

Hybrid powertrains typically include an internal combustion engine (ICE), an electric motor (EM), and one or more torque generators that provide torque to a driveline to propel a vehicle. Two types of hybrid powertrains include a full hybrid powertrain and a mild hybrid powertrain. In a full hybrid powertrain, the EM drives the drivetrain directly, without transferring torque through a component of the ICE. In a mild hybrid configuration the EM is coupled to the ICE through an accessory drive. Torque generated by the EM is transferred to the drivetrain through the ICE. An exemplary mild hybrid powertrain includes a so-called belt alternator starter (BAS) system. In the BAS system, the EM is coupled to the ICE via a belt and pulley configuration, which drives other accessory components, such as pumps and compressors.

Powertrain torque control typically includes two torque control domains: axle torque and propulsion torque. In a mild hybrid powertrain, the propulsion torque is the output torque at the crankshaft of the ICE, which includes the EM torque contribution.

During an auto start of the engine, a control module spins up the engine using the electric motor. A crankshaft of the engine is rotated at higher speeds during auto start than during a conventional startup of an engine via a starter. Since fuel is not initially enabled during an auto start, compression and expansion pulses of the engine cause the spin-up of the engine to include increases and decreases in a rate of change of the engine speed.

SUMMARY

In one embodiment, a control system for a hybrid powertrain is provided and includes an engine start detector that detects when an engine of the hybrid powertrain is activated via an electric motor during an auto start. An electric motor speed monitor determines a first speed of the electric motor for a first time and a second speed of the electric motor for a second time after detection of the engine in an active state. A control module determines a rate of change in speed of the electric motor based on the first speed and the second speed. The control module adjusts torque output of the electric motor during startup of the engine and based on the rate of change in speed.

In other features, a hybrid powertrain system of a vehicle is provided and includes an engine and an electric motor that applies a torque on the engine during an auto start. An engine start detector detects when the engine is activated via the electric motor. A sensor generates a speed signal that indicates speed of the engine and/or the electric motor. A control module that determines a rate of change in speed of the engine and/or the electric motor based on the engine start detector detecting the engine in an active state and the speed signal. The control module adjusts torque output of the electric motor during startup of the engine and based on the rate of change in speed.

In further features, a method of operating a hybrid powertrain control system is provided and includes detecting when an engine of the hybrid powertrain is activated by an electric motor during an auto start. A first speed of the engine is determined for a first time and a second speed of the engine is determined for a second time after detection of the engine in an active mode. A rate of change in speed of said engine is determined based on the first speed and the second speed. Torque output of the electric motor is adjusted during startup of the engine and based on the rate of change in speed.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

Furthermore, in the following description the term auto start refers to the startup of an engine by a control module via an electric motor. An auto start does not refer to a change in an ignition state. In a hybrid vehicle an engine may be depowered/deactivated during different situations, such as during low-power demand periods, etc. For example only, an auto start may occur after a vehicle has approached and stopped at a red traffic light and the engine has been shut down or deactivated. When a brake pedal of the vehicle is not depressed and/or when an accelerator pedal of the vehicle is depressed, an auto start may be initiated.

During an auto start, an electric motor spins-up an engine at increased speeds over that commonly associated with a conventional starter. The electric motor provides a smoother and less fuel consuming start of the engine than starts performed using a starter. In spinning-up the engine, the electric motor may provide different levels of torque. This torque may be applied before fuel injection to the engine is enabled and before manifold absolute pressure of the engine is less than a predetermined manifold absolute pressure.

Figure 1:
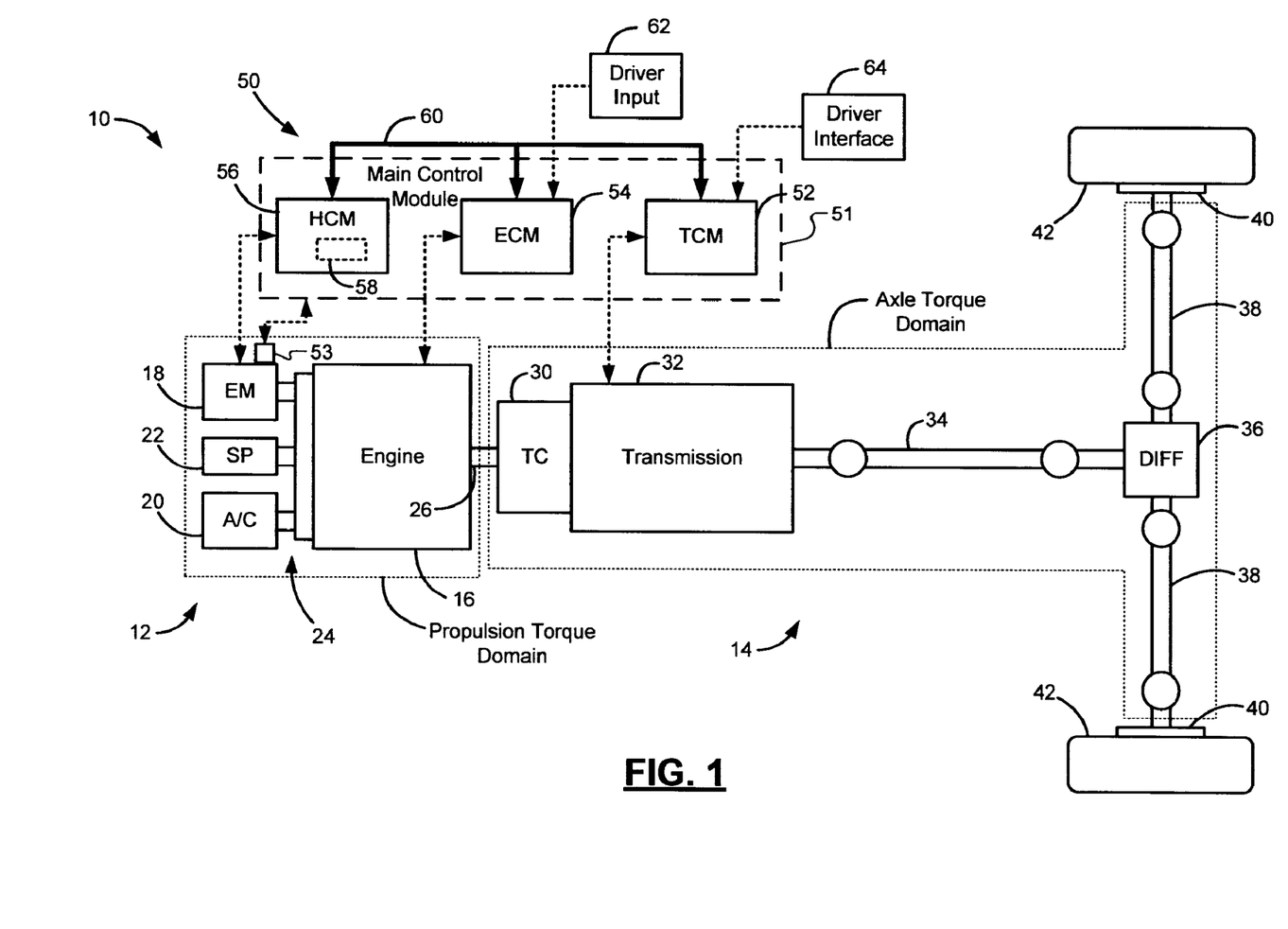
FIG. 1 is an exemplary hybrid powertrain system providing auto start engine pulse reduction/cancellation in accordance with an embodiment of the present disclosure.

Referring now to FIG. 1, an exemplary hybrid powertrain system 10 providing auto start engine pulse reduction/cancellation is shown. Although the powertrain system 10 is illustrated as a rear wheel drive (RWD) powertrain, it is appreciated that the embodiments of the present disclosure can be implemented with any other powertrain configuration. The powertrain system 10 includes a propulsion system 12 and a drivetrain system 14. The propulsion system 12 includes an internal combustion engine (ICE) 16 and an electric motor (EM) 18. The propulsion system 12 can also include auxiliary components including, but not limited to, an A/C compressor 20 and a steering pump 22. The EM 18 and the auxiliary components are coupled to the ICE 16 using a belt and pulley system 24. The belt and pulley system 24 may be coupled to a crankshaft 26 of the ICE 16 and enable torque to be transferred between the crankshaft 26 and the EM 18 and/or the auxiliary components. This configuration is referred to as a belt alternator starter (BAS) system.

The crankshaft 26 drives the drivetrain system 14. The drivetrain system 14 includes a flexplate or flywheel (not shown), a torque converter or other coupling device 30, a transmission 32, a propeller shaft 34, a differential 36, axle shafts 38, brakes 40 and driven wheels 42. A propulsion torque ($T_{PROP}$) that is output at the crankshaft 26 of the ICE 16 is transferred through the drivetrain system components to provide an axle torque ($T_{AXLE}$) at the axle shafts 38 to drive the wheels 42. More specifically, $T_{PROP}$ is multiplied by several gear ratios provided by the coupling device 30, the transmission 32 and the differential 36 to provide $T_{AXLE}$ at the axle shafts 38. Essentially, $T_{PROP}$ is multiplied by an effective gear ratio, which is a function of a ratio introduced by the coupling device 30, a transmission gear ratio determined by transmission input/output shaft speeds, a differential ratio, as well as any other component that may introduce a ratio in the drivetrain system 14 (e.g., a transfer case in a four wheel drive (4WD) or all wheel drive (AWD) powertrain). For the purposes of torque control, the $T_{AXLE}$ domain includes the ICE 16 and the EM 18.

The powertrain 10 also includes a control system 50, which regulates torque output of the EM 18 during auto starts of the engine 16. The control system 50 includes a main control module 51 that may include a transmission control module (TCM) 52, an engine control module (ECM) 54 and a hybrid control module (HCM) 56. The control system 50 may regulate the torque output of the EM 18 based on speed of the EM 18, which may be detected by a speed sensor 53. The information from the speed sensor 51 may be provided directly to the HCM 56. This allows for quick detection of the speed of the EM 18 and adjustment of the output torque of the EM 18. The output torque may be applied to a crankshaft of the engine 16.

The main control module 51 controls output torque generated via the TCM 52, ECM 54 and HCM 56. The HCM 56 can include one or more sub-modules including, but not limited to, a BAS control processor (BCP) 58. The TCM 52, ECM 54 and HCM 56 communicate with one another via a controller area network (CAN) bus 60. A driver input 62 communicates with the ECM. The driver input 62 can include, but is not limited to, an accelerator pedal and/or a cruise control system. A driver interface 64 communicates with the TCM 52. The driver interface 64 includes, but is not limited to, a transmission range selector (e.g., a PRNDL lever).

The control system 50 may operate based on coordinated torque control which may include an axle torque domain and a propulsion torque domain. $T_{PROP}$ is the crankshaft output torque, which may include the EM torque contribution. The coordinated torque control according to the present disclosure implements axle torque ($T_{AXLE}$) arbitration in the ECM to provide an arbitrated axle torque ($T_{AXLEARB}$) and splits the propulsion torque control responsibility to the ECM and the HCM. This split propulsion coordinated torque control facilitates component protection, engine overspeed prevention and system remedial action, among other torque requests, on the ECM. Hybrid propulsion torque control resumes in the HCM where the ECM leaves off and implements transmission torque control, regenerative braking, and engine overspeed prevention, among other torque requests.

The coordinated torque control may monitor the accelerator pedal position ($\alpha_{PED}$) and the vehicle speed ($V_{VEH}$). A driver intended or desired axle torque ($T_{AXLEDES}$) is determined based on $\alpha_{PED}$ and $V_{VEH}$. For example, APED and $V_{VEH}$ can be used as inputs to pre-calibrated, pre-stored lookup table, which provides a corresponding $T_{AXLEDES}$. The ECM 54 arbitrates $T_{AXLEDES}$ and other torque requests to provide $T_{AXLEARB}$. The other torque requests include one or more torque requests provided in an axle torque request set. The torque requests are generated by a torque feature and include, but are not limited to, an absolute torque value, a minimum torque limit value, a maximum torque limit value or a delta torque value request. The torque features associated with the axle torque request set include, but are not limited to, a traction control system (TCS), a vehicle stability enhancement system (VSES) and a vehicle overspeed protection system (VOS). Upon determining $T_{AXLEARB}$, $T_{AXLEARB}$ is converted into a propulsion torque ($T_{PROPECM}$) within the ECM 54 using the effective gear ratio. After having determined $T_{PROPECM}$, the ECM 54 arbitrates $T_{PROPECM}$ and a plurality of other propulsion torque requests, for which the ECM 54 is responsible, to provide a final $T_{PROPECM}$ to the HCM 56.

The HCM 56 may issue a torque request to set the engine torque to zero by deactivating the engine cylinders (e.g., by shutting-off the fuel to the cylinders). This can occur during vehicle coast down situations when the accelerator pedal position is zero. For example, the fuel is shut-off and the regenerative braking of the vehicle commences to transfer the kinetic energy of the vehicle into electric power via the EM 18. To facilitate this, a torque converter clutch that links the wheel torque to the crankshaft is engaged. Through this, the EM 18 is driven. Accordingly, a torque request going into the ECM 54 propulsion torque arbitration is provided from the HCM 56, such that two torque requesters input into the ECM 54 propulsion torque arbitration: the driver/cruise (axle torque arbitrated) propulsion torque request and an HCM 56 zero fuel torque request.

The TCM 52 provides an arbitrated propulsion torque value ($T_{PROPTCM}$). More specifically, the TCM 52 arbitrates a plurality of torque requests from torque features. An exemplary TCM torque feature is a transmission protection algorithm that generates a maximum torque limit to limit the torque at the transmission input shaft. The maximum torque limit indicates the maximum allowable torque through the transmission input shaft in order to protect transmission components.

Both $T_{PROPECM}$ from the ECM 54 and $T_{PROPTCM}$ from the TCM 52 are sent to the HCM 56, which completes the $T_{PROP}$ arbitration. More specifically, the HCM 56 arbitrates $T_{PROPECM}$, $T_{PROPECM}$ and other torque requests to provide $T_{PROPFINAL}$. The other torque requests include one or more torque requests provided in a propulsion torque request set. The torque requests are each generated by a torque feature and include, but are not limited to, an absolute torque value, a minimum torque limit value, a maximum torque limit value or a delta torque value request. The torque features associated with the propulsion torque request set include, but are not limited to, regenerative braking, engine overspeed protection and EM boost.

The HCM 56 determines $T_{ICE}$ and $T_{EM}$ based on $T_{PROPFINAL}$. More specifically, the HCM 56 includes an optimization algorithm, which partitions $T_{PROPFINAL}$ based on the available torque output of each of the ICE 16 and the EM 18. $T_{ICE}$ is sent to the ECM 54, which generates control signals for achieving $T_{ICE}$ using the ICE 16. The HCM 56 generates control signals based on $T_{EM}$ for achieving $T_{EM}$ using the EM 18.

Figure 2:
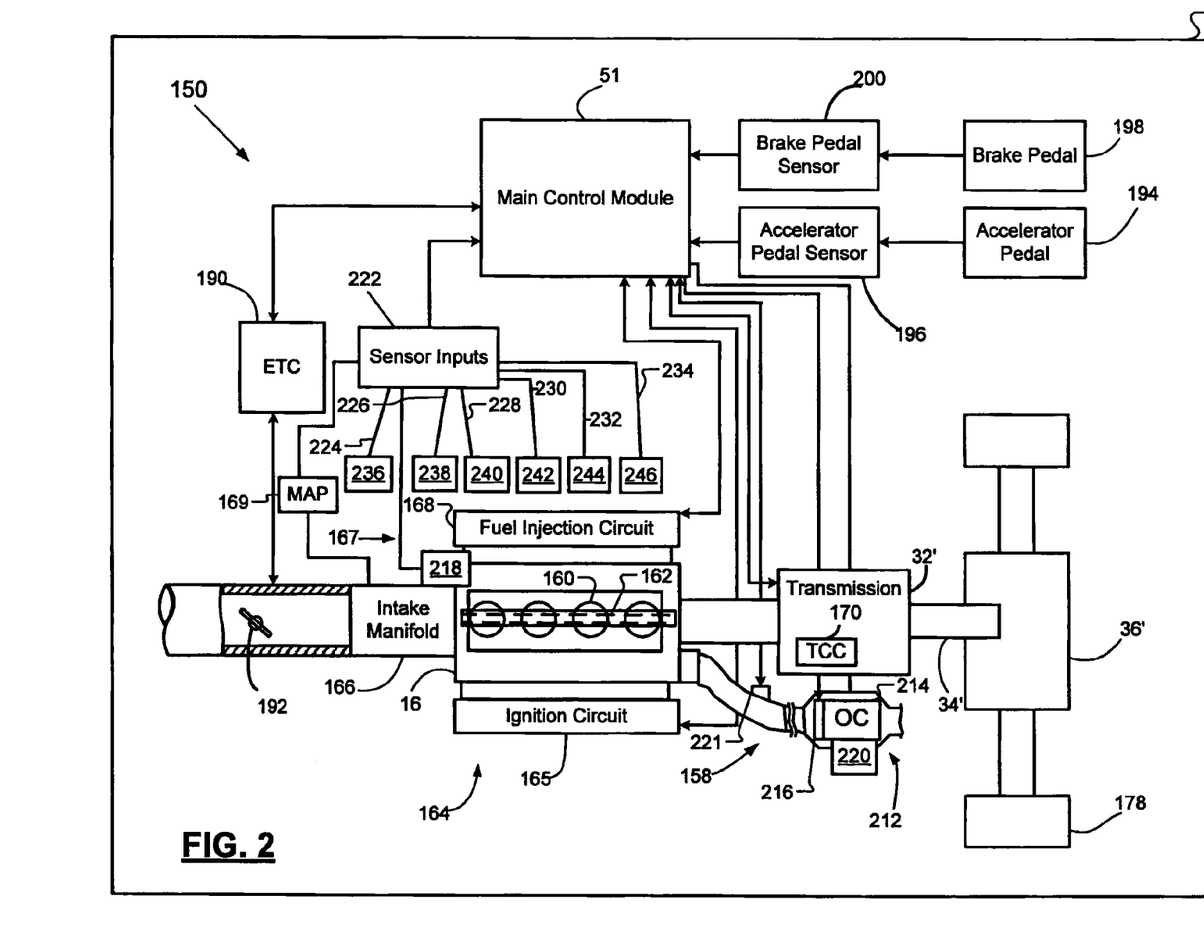
FIG. 2 is a functional block diagram of an exemplary internal combustion engine system of the hybrid powertrain system of FIG. 1.

Referring now to FIG. 2, a functional block diagram of an ICE system 150 incorporating control based on a secured count of fueled cylinders is shown. The ICE system 150 is on a vehicle 152 and includes the ICE 16 and an exhaust system 158.

The ICE 16 has cylinders 160. Each cylinder 160 may have one or more intake valves and/or exhaust valves. Each cylinder 160 also includes a piston that rides on a crankshaft 162. The ICE 16 may be configured with an ignition system 164 with an ignition circuit 165. The ICE 16 is also configured with a fuel injection system 167 with a fuel injection circuit 168, and the exhaust system 158. The ICE 16 includes an intake manifold 166. The ICE 16 combusts an air and fuel mixture to produce drive torque. The ICE 16, as shown, includes four cylinders in an in-line configuration. Although FIG. 2 depicts four cylinders (N=4), it can be appreciated that the engine 54 may include additional or fewer cylinders. For example, engines having 2, 4, 5, 6, 8, 10, 12 and 16 cylinders are contemplated. It is also anticipated that the fuel injection control of the present invention can be implemented in a V-type or another type of cylinder configuration.

An output of the ICE 16 is coupled by a torque converter 170, a transmission 32', a driveshaft 34' and a differential 36' to driven wheels 178. The transmission 32' may, for example, be a continuously variable transmission (CVT) or a step-gear automatic transmission. The transmission 32' is controlled by the main control module 51.

Air is drawn into the intake manifold 166 via an electronic throttle controller (ETC) 190, or a cable-driven throttle, which adjusts a throttle plate 192 that is located adjacent to an inlet of an intake manifold 166. The adjustment may be based upon a position of an accelerator pedal 194 and a throttle control algorithm that is executed by the control module 51. The throttle 192 adjusts output torque that drives the wheels 178. An accelerator pedal sensor 196 generates a pedal position signal that is output to the control module 51 based on a position of the accelerator pedal 194. A position of a brake pedal 198 is sensed by a brake pedal sensor or switch 200, which generates a brake pedal position signal that is output to the control module 51. During an auto start, the control module may adjust the output torque from the EM 18 based on the signals from the accelerator pedal sensor 196 and the brake pedal sensor 200.

Air is drawn into the cylinders 160 from the intake manifold 166 and is compressed therein. Fuel is injected into cylinders 160 by the fuel injection circuit 168 and spark may be generated by the ignition system 164, when included, to ignite the air/fuel mixtures in the cylinders 160. In diesel applications, the ignition circuit may include glow plugs. Exhaust gases are exhausted from the cylinders 160 into the exhaust system 158. In some instances, the ICE system 150 can include a turbocharger that uses an exhaust driven turbine to drive a compressor that compresses the air entering the intake manifold 166. The compressed air may pass through an air cooler before entering into the intake manifold 166.

The fuel injection circuit 168 may include fuel injectors that are associated with each of the cylinders 160. A fuel rail provides fuel to each of the fuel injectors after reception from, for example, a fuel pump or reservoir. The control module 51 controls operation of the fuel injectors. The number and timing of fuel injections into each of the cylinders 160 is controlled, as well as the number of fuel injections per combustion cycle and the timing of the fuel injection(s) during each combustion cycle. The fuel injection timing may be relative to crankshaft positioning. Fuel injection may be initiated after spin-up of the engine 26 and after a manifold absolute pressure (MAP) decreases below a predetermined MAP value. The MAP pressure may be monitored by the control module 51 via a MAP sensor 169.

The ignition system 164 may include spark plugs or other ignition devices for ignition of the air/fuel mixtures in each of the cylinders 160. The ignition system 164 also may include the control module 51. The control module 51 may, for example, control spark timing relative to crankshaft positioning.

The exhaust system 158 may include exhaust manifolds and/or exhaust conduits and a filter system 212. The exhaust manifolds and conduits direct the exhaust exiting the cylinders 160 into the filter system 212. Optionally, an EGR valve re-circulates a portion of the exhaust back into the intake manifold 166. A portion of the exhaust may be directed into a turbocharger to drive a turbine. The turbine facilitates the compression of the fresh air received from the intake manifold 166. A combined exhaust stream flows from the turbocharger through the filter system 212.

The filter system 212 may include a catalytic converter or an oxidation catalyst (OC) 214 and a heating element 216, as well as a particulate filter, a liquid reductant system and/or other exhaust filtration system devices. The heating element 216 may be used to heat the oxidation catalyst 214 during startup of the ICE 16 and a light off process of the OC 214 and be controlled by the control module 51. The liquid reductant may include urea, ammonia, or some other liquid reductant. Liquid reductant is injected into the exhaust stream to react with NOx to generate water vapor ($H_2O$) and $N_2$ (nitrogen gas).

The ICE system 150 further includes an engine temperature sensor 218, an exhaust temperature sensor 220, and one or more oxygen sensors 221. The engine temperature sensor 218 may detect oil or coolant temperature of the ICE 16 or some other engine temperature. The exhaust temperature sensor 220 may detect temperature of the oxidation catalyst 214 or some other component of the exhaust system 158. The temperatures of the ICE 16 and the exhaust system 158 may be indirectly determined or estimated based on engine and exhaust operating parameters and/or other temperature signals. Alternatively, the temperatures of the ICE 16 and the exhaust system 158 may be determined directly via the engine and exhaust temperature sensors 218, 220.

Other sensor inputs collectively indicated by reference number 222 and used by the control module 51 include an engine speed signal 224, a vehicle speed signal 226, a power supply signal 228, oil pressure signal 230, an engine temperature signal 232, and a cylinder identification signal 234. The sensor input signals 224-234 are respectively generated by engine speed sensor 236, vehicle speed sensor 238, a power supply sensor 240, an oil pressure sensor 242, an engine temperature sensor 244, and cylinder identification sensor 246. Some other sensor inputs may include an intake manifold pressure signal, a throttle position signal, a transmission signal, and manifold air temperature signal.

The control module 51 may modulate torque based upon, for example, a pedal position signal from the pedal position sensor 196 and/or signals from other sensors. The pedal position sensor 196 generates the pedal position signal based upon actuation of the accelerator pedal 194 by a driver. The other sensors may include, for example, a mass air flow (MAF) sensor, the MAP sensor 169, an engine speed sensor, a transmission sensor, and a cruise control system sensor, and/or a traction control system sensor.

Figure 3:
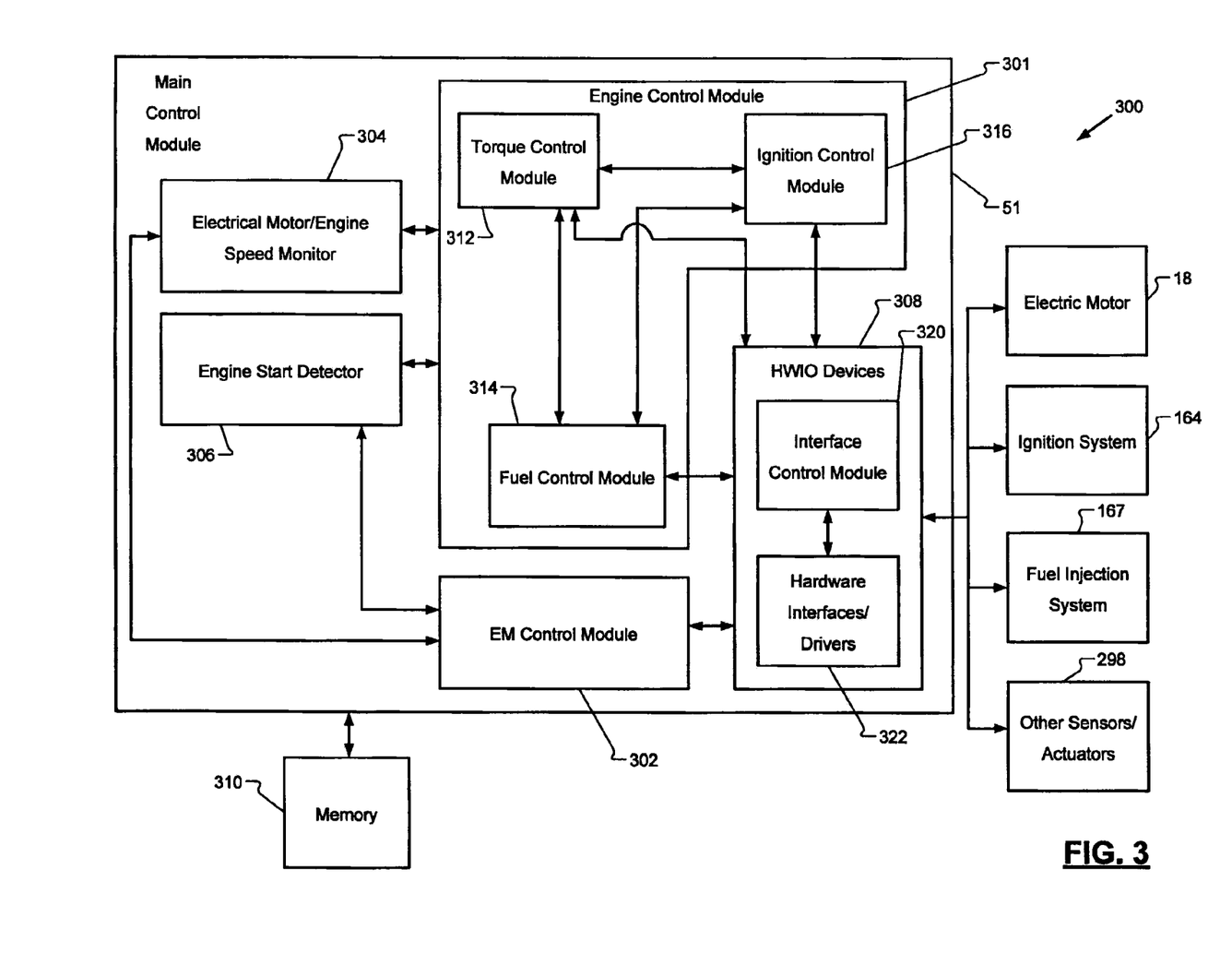
FIG. 3 is a functional block diagram of a hybrid powertrain control system that performs auto start engine pulse reduction/cancellation in accordance with an embodiment of the present disclosure.

Referring now also to FIG. 3, a functional block diagram of a hybrid powertrain control system 300 that performs auto start engine pulse reduction and/or cancellation is shown. The hybrid powertrain control system 300 includes the main control module 51. The main control module 51 is in communication with the electric motor 18, the ignition system 164, the fuel injection system 167 and other sensors and actuators 298. The other sensors and actuators 298 may include the sensors and actuators above-described. The main control module 51 includes an engine control module 301, an electric motor control module 302, an electric motor/engine speed monitor 304, an engine start detector 306 and hardware input/output (HWIO) devices 308. The main control module 51 is in communication with the electric motor 18, the ignition system 164, the fuel injection system 167 and the other sensors and actuators 298 via the HWIO devices 308. The main control module 51 may be in communication with memory 310.

The engine control module 300 may include a torque control module 312, a fuel control module 314 and an ignition control module 316. The torque control module may control the output torque of the engine and/or the torque provided to the transmission. The fuel control module 314 may control fuel pump and fuel injector timing, fuel pressures, etc. The ignition control module 316 may control ignition or spark timing within the cylinders of the engine. The fuel and ignition control may be in association with disabling and enabling of one or more cylinders.

The HWIO devices 308 include an interface control module 320 and hardware interfaces/drivers 322. The interface control module 320 provides an interface between the fuel control and ignition control software and the hardware interfaces/drivers 322. The hardware interfaces/drivers 322 control operation of, for example, fuel injectors, fuel pumps, ignition coils, spark plugs, throttle valves, solenoids and other torque control devices and actuators. The hardware interface/drivers 322 also receive sensor signals, which are communicated to the respective modules 312, 314 and 316.

Although the embodiments of the following FIGS. 4-8 are described primarily with respect to motor speed, as an electric motor of a mild-hybrid system is coupled to an engine, the embodiments may apply directly to engine speed also. For example, engine speed changes proportionally with a change in electric motor speed. For this reason, electric motor speed and/or engine speed may be detected, monitored, and used in the various below described calculations, determinations and tasks.

The electric motor speed may be detected, monitored and used in the described calculations over the engine speed to provide a quicker response. Electric motor speed may be detected and provided directly to a hybrid control module. This may be quicker and/or more accurate than, for example, detection of engine speed by a crankshaft rotation sensor.

Figure 4:
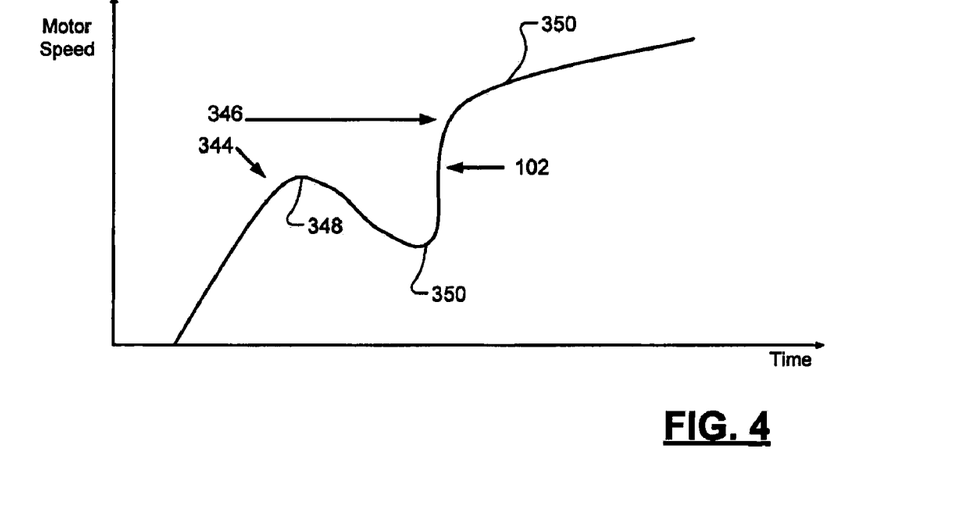
FIG. 4 is a motor speed signal diagram that illustrates spin-up phases of an electric motor during engine startup.
Figure 5:
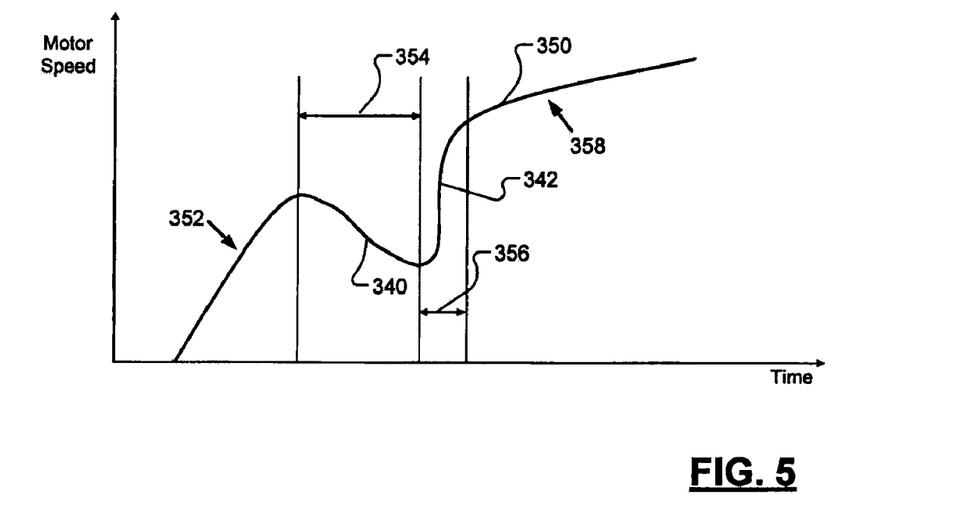
FIG. 5 is a motor speed signal diagram that illustrates compression and expansion portions of a motor speed signal during engine startup.

Referring now to FIGS. 4 and 5, a motor speed signal 350 is shown. The motor speed signal 350 corresponds to speed of an electric motor and an engine of a vehicle during an auto start. The motor speed signal 350 includes multiple phases, which have corresponding engine pulses. The engine pulses occur due to compression and expansion strokes of the engine and refer to the decreasing and increasing changes in engine speed during the auto start process. As an example, four phases are shown and may be referred to as an initial phase 352, a compression phase 354, an expansion phase 356, and a final phase 358. Although the phases are based on strokes of the engine, each phase may be associated with different and/or multiple combustion cycle strokes. For example, during one of the phases a first cylinder may be in an intake stroke while a second cylinder is in one or more of an intake, a compression, an expansion or an exhaust stroke.

During an auto start, compression and expansion strokes of the engine causes the motor speed to fluctuate. During a compression stroke of one or more cylinders of the engine the motor speed may decrease, as identified by motor speed signal portion 340. During an expansion stroke of one or more cylinders of the engine the motor speed may increase, as identified by motor speed signal portion 342.

As a result in speed changes of the motor, an engine transitions through different spin-up phases. Two spin-up phases are identified by arrows 344 and 346. The first spin-up phase 344 corresponds with motor speed prior to a compression stroke. The second spin-up phase 346 corresponds with motor speed during and after an expansion stroke. A first transition point 348 exists at the beginning of a compression stroke or between the first and second phases 352, 354. A second transition point 350 between a compression stroke and an expansion stroke or between the second and third phases 340, 342.

Figure 6:
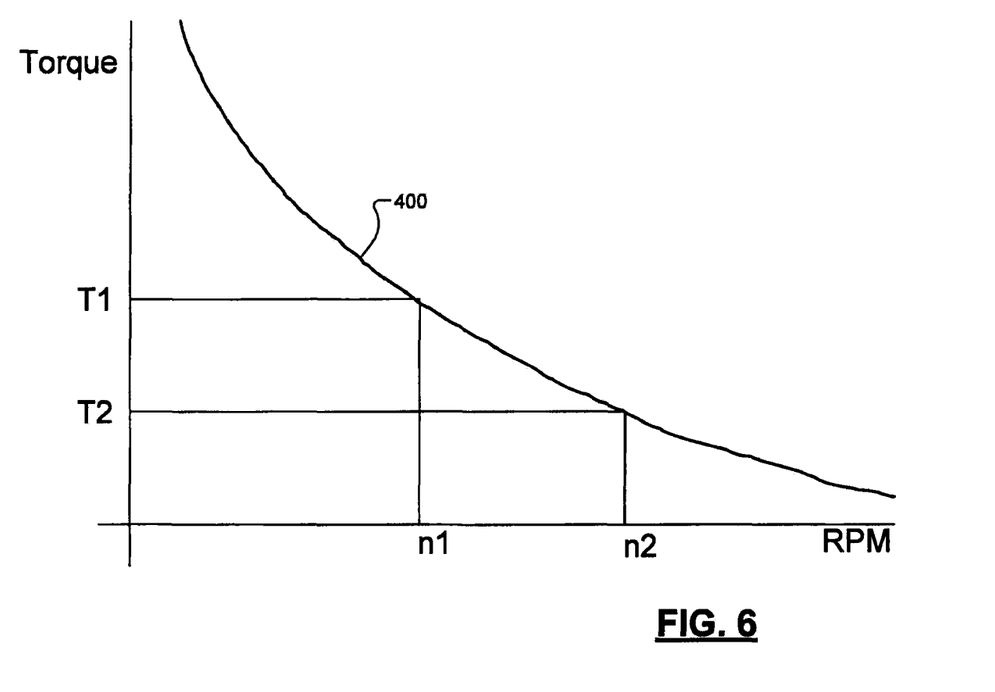
FIG. 6 is an exemplary engine torque versus engine speed diagram.

Torque output of an engine may be adjusted during an auto start based on a power limit curve, engine speed and a constant power source output. FIG. 6 provides a power limit curve relating engine torque output to engine speed.

Referring now to FIG. 6, an exemplary engine torque versus engine speed diagram is shown. A power limit curve 400 is shown and represents a maximum power that may be provided by a power source, such as a battery. When operating based on a constant power source output, when speed of an electric motor/engine changes, torque output of the engine changes.

For example, during engine pulses, when the engine speed decreases from n2 to n1 because of an approaching compression phase, the torque output of the engine may increase from T2 to T1. As another example, when the engine speed increases from n1 to n2 because of an approaching expansion phase, the torque output of the engine may decrease from T1 to T2.

To rely on this relationship between engine speed and torque output of an engine for a constant power output of a power source has associated disadvantages. One disadvantage is that torque authority is limited. Torque output control of the engine is limited to the power limit curve. Another disadvantage is that torque output of the engine does not change until engine speed changes.

The embodiments described herein provide increased flexibility in adjusting engine torque output during an auto start. The embodiments also anticipate a change in engine speed before a change in engine speed occurs. This allows for earlier adjustment in engine torque output via an adjustment in electric motor operation. The anticipation of engine speed changing also allows the control system to prevent a drop in engine speed during spin-up.

Figure 7:
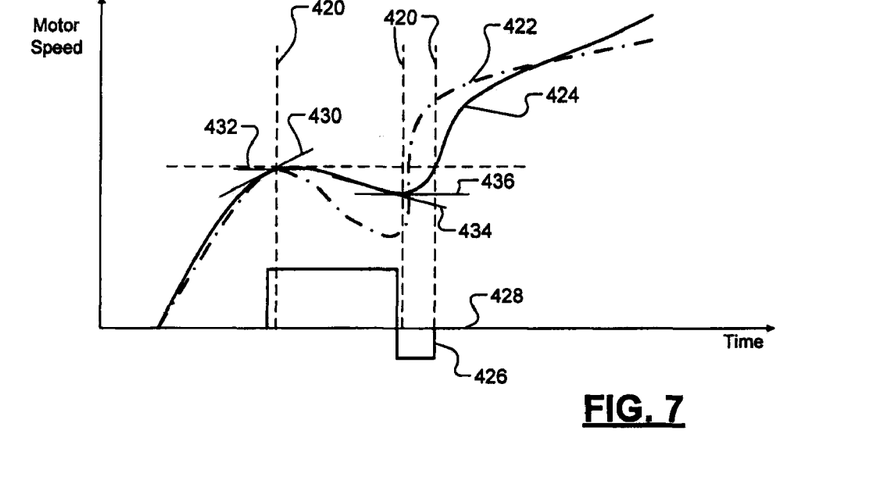
FIG. 7 is a motor speed diagram that illustrates engine pulse reduction affect on motor speed in accordance with an embodiment of the present disclosure.

Referring now to FIG. 7, a motor speed diagram that illustrates engine pulse reduction affect on motor speed in accordance with an embodiment of the present disclosure is shown. The vertical dashed lines 420 represent transitions between initial, compression, expansion and final phases.

The embodiments herein include the monitoring of a change in engine speed or the derivative of a detected engine speed signal. The monitoring of the change in engine speed allows for the detection in a rate of change in engine speed. This allows for early detection of an approaching compression phase or an expansion phase of an engine. When a rate of change in electric motor and/or engine speed is detected, electric motor torque output may be adjusted. The electric motor torque output may be adjusted, for example, to compensate for a decrease in engine speed due to a compression phase or to compensate for an increase in engine speed due to an expansion phase.

The motor speed diagram includes a first motor speed signal 422 that corresponds to an engine operating in a normal state without engine pulse suppression and/or cancellation. A second motor speed signal 424 is also shown that corresponds with an engine operating in an engine pulse suppression and/or compression state.

During an initial phase the electric motor output torque may be at a predetermined output torque level. The predetermined output torque level may correspond with a normal electric motor output torque for spin-up. When the rate of increase in engine speed begins to slow down or when the slope of the engine speed curve decreases, electric motor output torque may be increased above the predetermined output torque level. This increased output is shown by a compression portion of an electric motor output torque curve 426. The electric motor output torque curve 426 illustrates when a positive torque and a negative torque may be provided that has a magnitude that is greater than the predetermined output torque level. The predetermined output torque level corresponds with the horizontal axis 428. The unit-of-measure of the vertical axis of motor speed does not apply to the electric motor output torque curve 426, which may have a unit-of-measure of Newton-meters (Nm).

The electric motor output torque may be increased when the slope of the motor speed signal 424 decreases or when the slope of the motor speed signal 424 decreases to a predetermined level. A first slop curve 430 is shown that corresponds with a point when the slope of the first engine speed curve 422 decreases. A second slope curve 432 is shown that corresponds with a point when the first engine speed signal 422 changes from increasing to decreasing, for example at a first inflection point. The change in electric motor output torque based on the first slope curve 430 provides earlier compensation due to a decrease in engine speed.

During a compression phase, when the rate of decrease in engine speed begins to slow down or when the slope of the engine speed curve 424 increases, electric motor output torque may be decreased below the predetermined output toque level. The electric motor output torque may be decreased when the slope increases or when the slope increases to a predetermined level. A third slope curve 434 is shown that corresponds with a point when the slope of the second engine speed curve 424 increases. A fourth slope curve 436 is shown that corresponds with a point when the engine speed changes from decreasing to increasing, for example at a second inflection point. The change in electric motor output torque based on the third slope curve 434 provides earlier compensation due to an increase in engine speed.

At approximately the beginning of the final phase the electric motor output torque may be returned to the predetermined output torque level.

Figure 8:
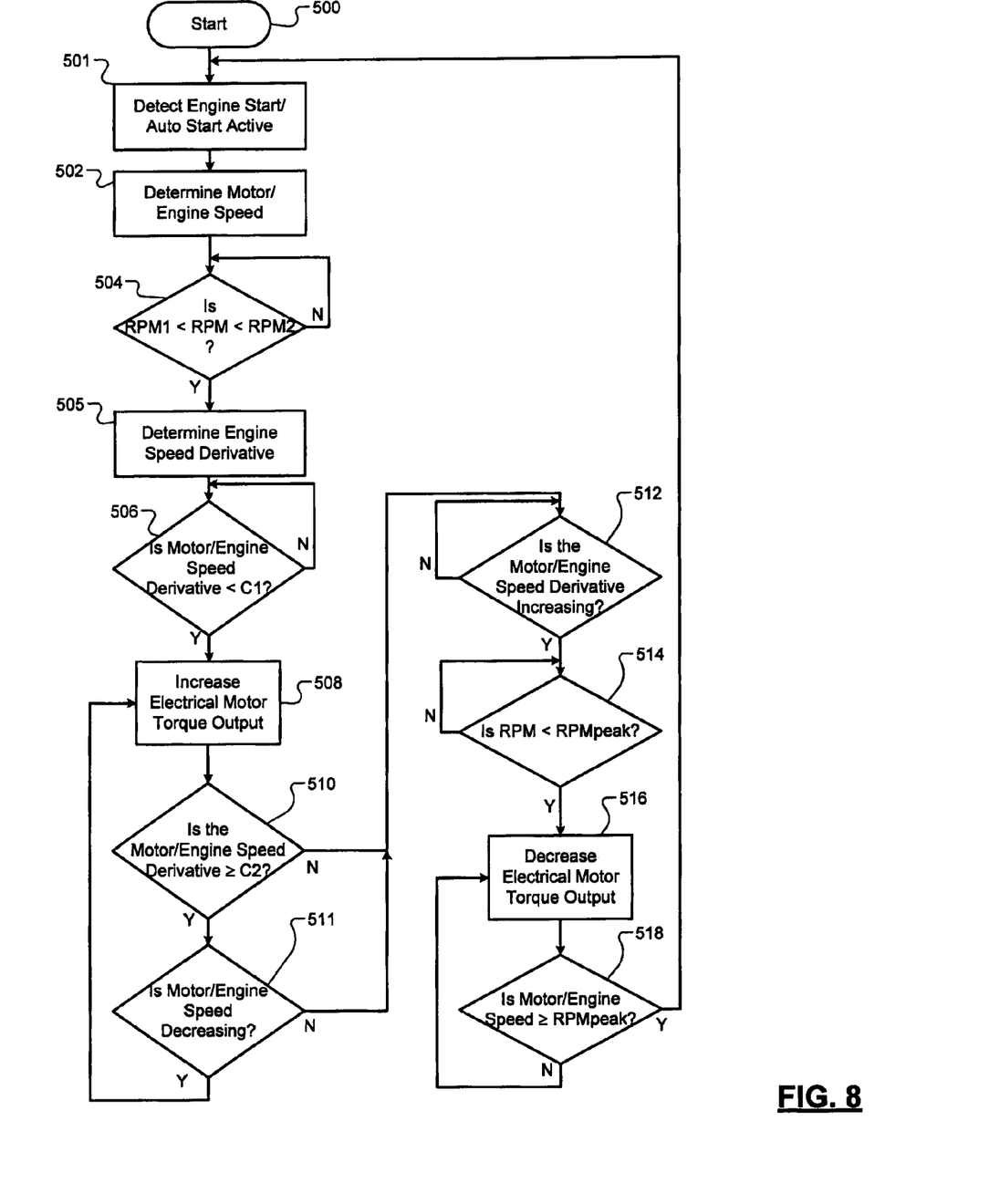
FIG. 8 is a logic flow diagram illustrating a method of controlling a hybrid powertrain system in accordance with an embodiment of the present disclosure.

Referring now to FIG. 8, a logic flow diagram illustrating a method of controlling a hybrid powertrain system including performing electric motor torque control during an auto start is shown. Although the following steps are primarily described with respect to the embodiments of FIGS. 1-3 and 7, the steps may be easily modified to apply to other embodiments of the present invention. The method may begin at step 500.

Steps 501-506 may be used to trigger engine pulse suppression and/or cancellation. In step 501, when an engine of the hybrid powertrain is activated via an electric motor that adjusts torque output of the engine, control proceeds to step 502.

In step 502, electric motor speed and/or engine speed is monitored and an electric motor speed signal or engine speed signal is generated. This may be performed by the electric motor speed monitor. The electric motor speed and/or the engine speed may be continuously and/or repeatedly monitored and updated during all of the steps of this method.

In step 504, when the electric motor speed $RPM_C$ is within a predetermined range $RPM_1 < RPM_C < RPM_2$, control proceeds to step 506. In one embodiment, $RPM_1$ is approximately 50 revolutions per minute and the $RPM_2$ is approximately 1100 revolutions per minute.

In the following steps, rate of changes in motor speed are determined. This may include determining a first speed S1 of an electric motor or engine for a first time T1 and a second speed S2 of the electric motor or engine for a second time T2. The rate of change in motor speed is equal to a difference in the first and second speeds S2−S1 divided by the difference in time T2−T1 is set. The current motor speed $RPM_C$ may be S1 or S2.

In step 505, a speed derivative is determined based on the speed of the engine and/or electric motor. In step 506, when the rate of change (speed derivative) in motor speed or slope of a motor speed curve associated with the engine speed signal decreases or when the rate of change in engine speed decreases below a first threshold, control may proceed to step 508. As an alternative and as shown in FIG. 8, when the rate of change in motor speed is less than a first calibration value C1, control proceeds to step 508. This alternative is shown in FIG. 8.

In step 508, control increases torque output of the electric motor. The output torque may be increased and biased above the predetermined output torque level. The increase may be based on manifold absolute pressure (MAP). This may be determined based on a MAP signal from a MAP sensor, such the map sensor or by calibration values stored in memory and used by motor control.

In step 510, when the rate of change in motor speed is greater than or equal to a second calibration value C2, control proceeds to step 511. In step 511, when the motor speed is decreasing, control maintains the increased torque output of the electric motor. Control proceeds to step 512 when the rate of change in motor speed is less than the second calibration value C2 or the motor speed is constant or increasing. The calibration values C1 and C2 may be predetermined, stored in a lookup table, and stored in memory, such as the memory. In one embodiment, the second calibration value C2 is less than the first calibration value C1.

In step 512, when the rate of change in motor speed increases control may proceed to step 514. In step 514, when the motor speed is less than a maximum motor speed $RPM_{PEAK}$, control proceeds to step 516. In one embodiment, the maximum motor speed $RPM_{PEAK}$ may be approximately 50-1100 revolutions per minute.

In step 516, control decreases output torque of the electric motor. The output torque may be decreased and biased below the predetermined output torque level. Control may maintain the decrease in output torque while the motor speed is less than the maximum motor speed and/or while the rate of change in motor speed is constant and/or increasing.

In step 518, when the motor speed is greater than or equal to the maximum motor speed $RPM_{PEAK}$, control may return to step 501 or ends this procedure.

The above-described steps are meant to be illustrative examples; the steps may be performed sequentially, synchronously, simultaneously, continuously, during overlapping time periods or in a different order depending upon the application.

The embodiments of the present disclosure suppress and/or cancel engine pulses. Driveability is improved due to a reduction in the fluctuations in the rate of change of electric motor speed during an auto start. This provides for a smooth engine spin-up.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system for a hybrid powertrain comprising:
   an engine start detector that detects when an engine of said hybrid powertrain is activated via an electric motor during an auto start;
   an electric motor speed monitor that determines a first speed of said electric motor for a first time and a second speed of said electric motor for a second time after detection of said engine in an active state; and
   a control module that determines a first rate of change in speed of said electric motor based on said first speed and said second speed,
   wherein said control module adjusts torque output of said electric motor during startup of said engine and based on said first rate of change in speed.

2. The control system of claim 1 wherein said control module increases torque output of said electric motor when said first rate of change in speed is less than a predetermined calibration value.

3. The control system of claim 1 wherein said control module increases torque output of said electric motor when at least one of said first speed and said second speed is greater than a first predetermined value and less than a second predetermined value.

4. The control system of claim 1 wherein said control module increases torque output of said electric motor based on a manifold absolute pressure of said engine.

5. The control system of claim 1 wherein said control module increases torque output of said electric motor when speed of said engine is decreasing.

6. The control system of claim 5 wherein said control module transitions from increasing to decreasing said torque output of said electric motor when a rate of change in speed of said electric motor increases.

7. The control system of claim 1 wherein said control module adjusts said torque output of said electric motor to compensate for a decrease in speed of said engine due to a compression stroke.

8. The control system of claim 1 wherein said control module adjusts said torque output of said electric motor to compensate for an increase in speed of said engine due to an expansion stroke.

9. The control system of claim 1 wherein said control module decreases torque output of said electric motor when at least one of a second rate of change in speed of said electric motor increases and speed of said engine is less than a predetermined value.

10. The control system of claim 9 wherein said control module ceases to decrease torque output of said electric motor when at least one of a third rate of change in speed of said electric motor ceases to increase and said engine speed of said engine is greater than or equal to said predetermined value.

11. A hybrid powertrain system of a vehicle comprising:
    an engine;
    an electric motor that applies a torque on said engine during an auto start;
    an engine start detector that detects when said engine is activated via said electric motor;
    a sensor generates a speed signal that indicates a speed of at least one of said electric motor and said engine; and
    a control module that determines a rate of change in speed of at least one of said electric motor and said engine based on said engine start detector detecting said engine in an active state and said speed signal,
    wherein said control module adjusts torque output of said electric motor during startup of said engine and based on said rate of change in speed.

12. The hybrid powertrain system of claim 11 wherein said control module adjusts said torque output of said electric motor to assist in rotation of a crankshaft of said engine when said rate of change in speed of said engine is decreasing.

13. The hybrid powertrain system of claim 11 wherein said control module reduces said torque output of said electric motor when speed of said engine is increasing.

14. The hybrid powertrain system of claim 13 wherein said control module increases said torque output of said electric motor when said rate of change in speed is decreasing.

15. The hybrid powertrain system of claim 11 further comprising a manifold absolute pressure sensor that generates a manifold absolute pressure signal,
   wherein said control module adjusts said torque output of said electric motor based on said manifold absolute pressure.

16. The hybrid powertrain system of claim 11 wherein said control module increases torque output of said electric motor when speed of said engine is decreasing and an updated rate of change in speed is less than a predetermined value.

17. The hybrid powertrain system of claim 11 wherein said control module decreases torque output of said electric motor when an updated rate of change in speed increases and speed of said engine is less than a predetermined value.

18. The hybrid powertrain system of claim 11 wherein said control module:
   determines a first speed of said engine for a first time and a second speed of said engine for a second time after detection of said engine in an active state; and
   determines the rate of change in speed of said engine based on said first speed and said second speed.

* * * * *